United States Patent [19]
Broughton

[11] Patent Number: 5,978,500
[45] Date of Patent: Nov. 2, 1999

[54] VIDEO IMAGING SYSTEM PARTICULARLY SUITED FOR DYNAMIC GEAR INSPECTION

[75] Inventor: Howard Broughton, Columbia Station, Ohio

[73] Assignee: The United States of America as represented by Administrator of the National Aeronautics and Space Administration, Washington, D.C.

[21] Appl. No.: 08/944,027

[22] Filed: Aug. 27, 1997

[51] Int. Cl.$^6$ .................................................. G06K 9/00
[52] U.S. Cl. .......................................... 382/141; 382/152
[58] Field of Search .................................... 382/141, 143, 382/152, 100, 129, 266; 356/23–24; 73/162

[56] References Cited

U.S. PATENT DOCUMENTS

| | | | |
|---|---|---|---|
| 3,816,712 | 6/1974 | Herzog | 235/92 MP |
| 4,618,256 | 10/1986 | Bartolomeo | 73/162 |
| 5,083,458 | 1/1992 | De George et al. | 73/162 |
| 5,219,389 | 6/1993 | Gutman | 73/162 |
| 5,224,377 | 7/1993 | Gutman | 73/162 |
| 5,307,676 | 5/1994 | Gutman | 73/162 |
| 5,373,735 | 12/1994 | Gutman | 73/162 |

*Primary Examiner*—Jose L. Couso
*Assistant Examiner*—Duy M. Dang
*Attorney, Agent, or Firm*—Kent N. Stone

[57] ABSTRACT

A digital video imaging system that captures the image of a single tooth of interest of a rotating gear is disclosed. The video imaging system detects the complete rotation of the gear and divide that rotation into discrete time intervals so that each tooth of interest of the gear is precisely determined when it is at a desired location that is illuminated in unison with a digital video camera so as to record a single digital image for each tooth. The digital images are available to provide instantaneous analysis of the tooth of interest, or to be stored and later provide images that yield a history that may be used to predict gear failure, such as gear fatigue. The imaging system is completely automated by a controlling program so that it may run for several days acquiring images without supervision from the user.

13 Claims, 3 Drawing Sheets

VIDEO IMAGING SYSTEM PARTICULARLY SUITED FOR DYNAMIC GEAR INSPECTION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The present invention relates to a method and apparatus for measuring and inspecting articles of manufacture, and, more particularly, to a method and apparatus including a digital video imaging system for non-contact measuring and inspecting of high speed meshing gears.

BACKGROUND OF THE INVENTION

It is frequently necessary to carefully inspect rotating objects, such as those found in the automotive industry; e.g., tires, engine components, transmissions components, differential gears, or even parts moved along the assembly line. Another object requiring careful inspection is helicopter transmission gears because they are subject to demanding torque and load requirements that lead to fatigue failure. Additionally, the meshing of the transmission gears is the primary source of cabin noise and often necessitates personnel to wear hearing protection. It is desired to analyze these meshing gears so as to reduce the attendant noise thereof and to define specific events in the failure process to better understand and predict failures. Gear mesh diagnostics includes a diagnostic system to warn of conditions leading to failure.

Many different approaches have been proposed in the past for providing efficient and accurate systems for inspecting gears and one such system is described in U.S. Pat. No. 5,373,735 ('735) which is herein incorporated by reference. The '735 patent discloses a gear testing method and apparatus for inspecting the contact area between selected tooth surfaces of a gear member, such as a spiral bevel or hypoid gear. The gear testing includes a coating device for coating a selected portion of the gear member with the material to form a footprint and a strobing device which is adjusted to illuminate and inspect one of the gears while the gears are still in rotation. It is beneficial to inspect a gear while it is being rotated because it may reveal a flaw thereof, such as a hairline crack, that may only be manifested while the gear of interest is rotating and meshing with a complementary tooth of a similarly rotating gear. It is desired that methods and an apparatus for performing gear inspection be provided without the need of any coating device so as to eliminate the attendant drawbacks thereof.

Accordingly, it is a primary object of the present invention to provide for methods and an apparatus for inspecting a gear that has no need for any coating device and performs such inspection without any need to contact a rotating and meshing gear.

It is a further object of the present invention to provide for an imaging system used to acquire temporal data in the form of images to construct a history of the possible failures of the rotating and contacting gears over time.

It is another object of the present invention to provide for images of a meshing gear operating under torque and load conditions so as to allow the ability to track a crack or pit developed in a gear and measure the progression or expansion of the crack or pit over time.

Further, it is an object of the present invention to provide for an imaging system used for gear inspection having a digitized output that can be immediately analyzed and thereby provide valuable feedback at the time of any possible failure.

Moreover, it is the object of the present invention to provide an automated and computer controlled imaging system used for gear inspection that can be continuously run to acquire multiple images without any need for any supervision of the imaging system.

SUMMARY OF THE INVENTION

The present invention is directed to a digital video imaging system that captures images of two meshing gears and provides, at any one time, a single digital image of an individual tooth of interest of the meshing gears. The digital video imaging system is particularly suited for analysis and inspection purposes, especially for analyzing gear failures over a period of time.

The gear inspection apparatus inspects a region encompassing the location of corresponding teeth of a gear mounted on a rotating shaft and each gear having a predefined number of teeth. The gear inspection apparatus comprises means for equating, means for illuminating and means for digitally recording an image. The means for equating determines the amount of shaft rotation of the gear and divides this amount into discrete time interval signals each defining the location of particular tooth of the gear under inspection. The equating means generates the discrete time interval signals in response to a first control signal. The means for illuminating illuminates the region of the location of the corresponding teeth in response to the time interval signals of the equating means for activation thereof. The means for digitally recording an image provides an output digital representation thereof. The digital means is focussed in correspondence with the means for illuminating so as to optically coincide on the region and is responsive to a second control signal for the activation thereof. In the preferred embodiment, the gear inspection apparatus further comprises a central processing unit receiving the output digital representation and generating the first and second control signals.

DETAILED DESCRIPTION OF THE PREFERRED EMBODIMENTS

Figure 1:
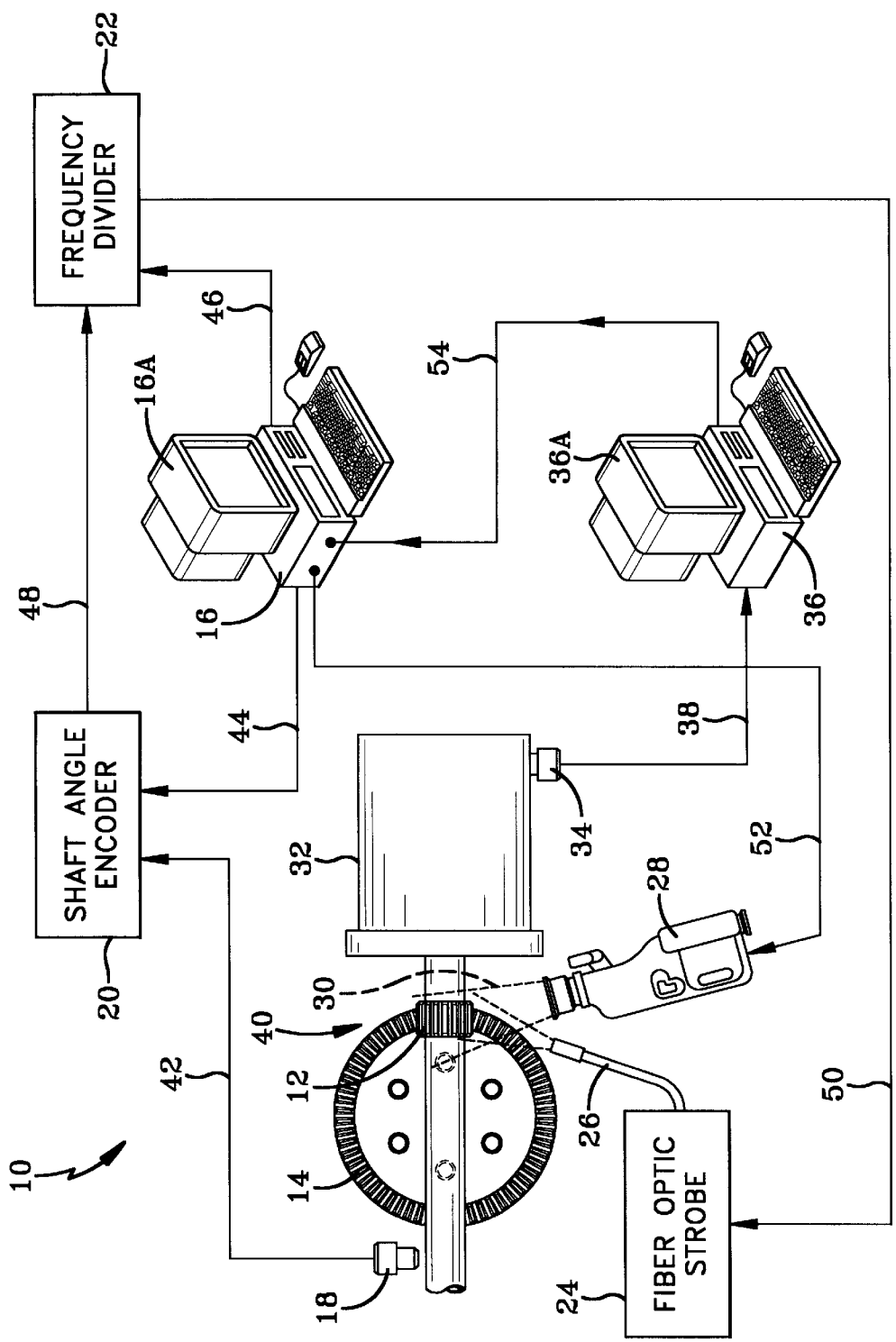
FIG. 1 is a block diagram of one embodiment of the present invention.

Referring now to the drawings, wherein the showings are for the purpose of illustrating preferred embodiments of the invention only and not for the purpose of limiting the same, the invention describes methods and an apparatus for the inspection of articles of manufacture. While the method and apparatus of the present invention may be applied to many different fields, it is contemplated by the present invention that the method and apparatus thereof are particularly suited to inspecting high speed rotating gears with one specific application being for inspecting the gears of helicopter transmissions. The present invention provides by inspection and documentation of the progression of tooth wear, gear pitting, and teeth fractures that lead to overall gear failure. In one embodiment the present invention is integrated with a vibration detection system and operates autonomously to capture images of each gear tooth at predetermined vibration thresholds. The practice of the present invention provides data that is capable of being analyzed to define specific events in the failure process which lead to a more complete understanding of the causal factors of gear failure.

A gear inspection apparatus of the present invention is particularly suited for inspecting a region encompassing the location of corresponding teeth of a gear mounted on a rotating shaft and each gear having a predefined number of teeth. The gear inspection apparatus comprises means for equating, means for illuminating and means for digitally recording an image of the tooth of interest of the rotating gear. The means for equating comprises means for sensing the occurrence one complete revolution of the rotating shaft, encoding means, and preferably a frequency divider. The means for equating determines the amount of shaft rotation of the gear and divides this amount into discrete time interval signals, each defining a location of a particular tooth on the gear. The equating means generates the discrete time interval signals in response to a first control signal. The means for illuminating illuminates the region encompassing the location of corresponding teeth of the gear. The means for illumination is responsive to the discrete time interval signals for the activation thereof. The means for digitally recording an image of each tooth of the rotating gear provides an output digital representation thereof. The digital recording means is focussed in correspondence with the means for illuminating so as to optically coincide on the region and is responsive to a second control signal for the activation thereof. The gear inspection apparatus preferably further comprises a central processing unit (CPU) that receives the output digital representation and generates the first and second control signals whose occurrences are determined by an application program running in the CPU. The CPU allows the gear inspection apparatus to gather data for gear analysis and without requiring any supervision thereof.

Referring now to FIG. 1, there is shown a video imaging gear inspection system 10 for inspecting a gear 12, having a predetermined number of teeth, during its dynamic rotating condition which detects and documents the possible gear failure that may occur during dynamic meshed engagement. The video imaging system 10 may be configured such that any given tooth of gear 12 can be viewed or analyzed in any sequence. Similarly, the video imaging system 10 may be configured to analyze gear 14 of FIG. 1. For example; for a gear 12 with twelve (12) teeth any one of those teeth can be analyzed in any order. If only every other tooth needs to be inspected and analyzed then the controlling program, to be described, being run in central processing unit (CPU) 16 can be configured to do so.

The video imaging system 10 comprises the central processing unit (CPU) 16 having a monitor 16A, a sensor 18, a shaft angle encoder 20, a frequency divider 22, a fiber optic strobe device 24 having a probe 26, and a digital video camera 28 having a field of view 30. The sensor 18, shaft angle encoder 20 and frequency divider 22 cooperate with each other to provide an enabling means for activating the fiber optic strobe device 24 so as to provide a single image of the tooth of interest of the gear 12. In one embodiment, the video imaging system 10 cooperates with and includes therein an arrangement of a vibration detection system comprising a rotatable means 32 for mounting and driving the rotating gears 12 and 14, a sensor 34 serving as means for sensing the amount of vibration of the rotatable means 32 and providing an electrical signal representative of the amount of vibration, and a CPU 36 having a monitor 36A and serving as means for receiving the electrical signal of the sensor 34 on signal path 38 and generating a trigger signal, to be further described, when the amount of vibration is greater than one or more predetermined values.

The rotating and meshing gears 12 and 14 may be of any appropriate type, such as planetary gears. Similarly, the rotatable means 32 mounting and driving gears 12 and 14 may be of any appropriate type. If desired, the rotating and meshing gears 12 and 14 and the rotatable means 32 may each be of the type described in the previously incorporated by reference '735 patent. For the embodiment of FIG. 1, the gears 12 and 14 are respectively illustrated as a toothed gear and a bevel gear. The meshing gears 12 and 14 and the rotatable means 32 may all be further described with reference to FIG. 2 which is a front view of the rotatable means 32.

Figure 2:
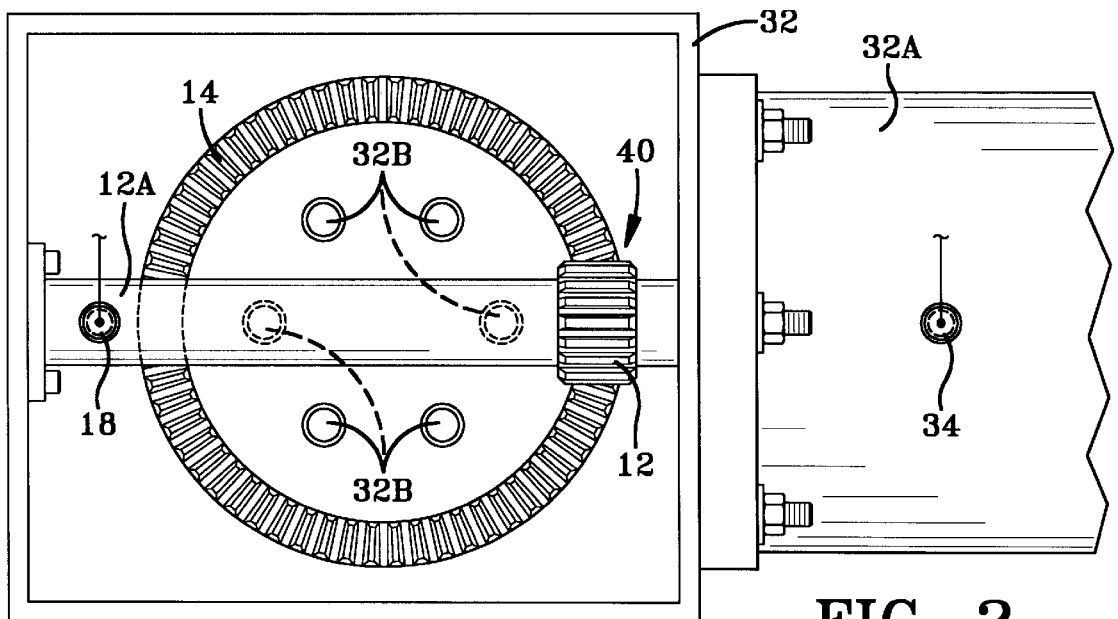
FIG. 2 schematically illustrates a front view of the rotatable means of FIG. 1 showing the intermeshing of the gears of FIG. 1.

FIG. 2 schematically illustrates the gear 12 as being connected to the drive shaft of drive motor assembly 32A of rotatable means 32 by a plurality of locking devices 32B. Similarly, FIG. 2 schematically illustrates the gear 12 as being connected to a drive shaft 12A, also part of rotatable means 32. FIG. 2 further schematically illustrates the placement of sensors 18 and 34. The sensors 18 and 34 may be respectively placed anywhere along the drive shaft 12A and the drive shaft of drive motor assembly 32A. FIG. 2 further illustrates a location 40 which corresponds to the location where the tooth of interest, such as that of gear 12, is being analyzed by the rendering of an image and which may further be described with reference to FIG. 3 which is a top view of the rotatable means 32 and also illustrates the general placement of fiber optic strobe device 24 and digital video camera 28.

Figure 3:
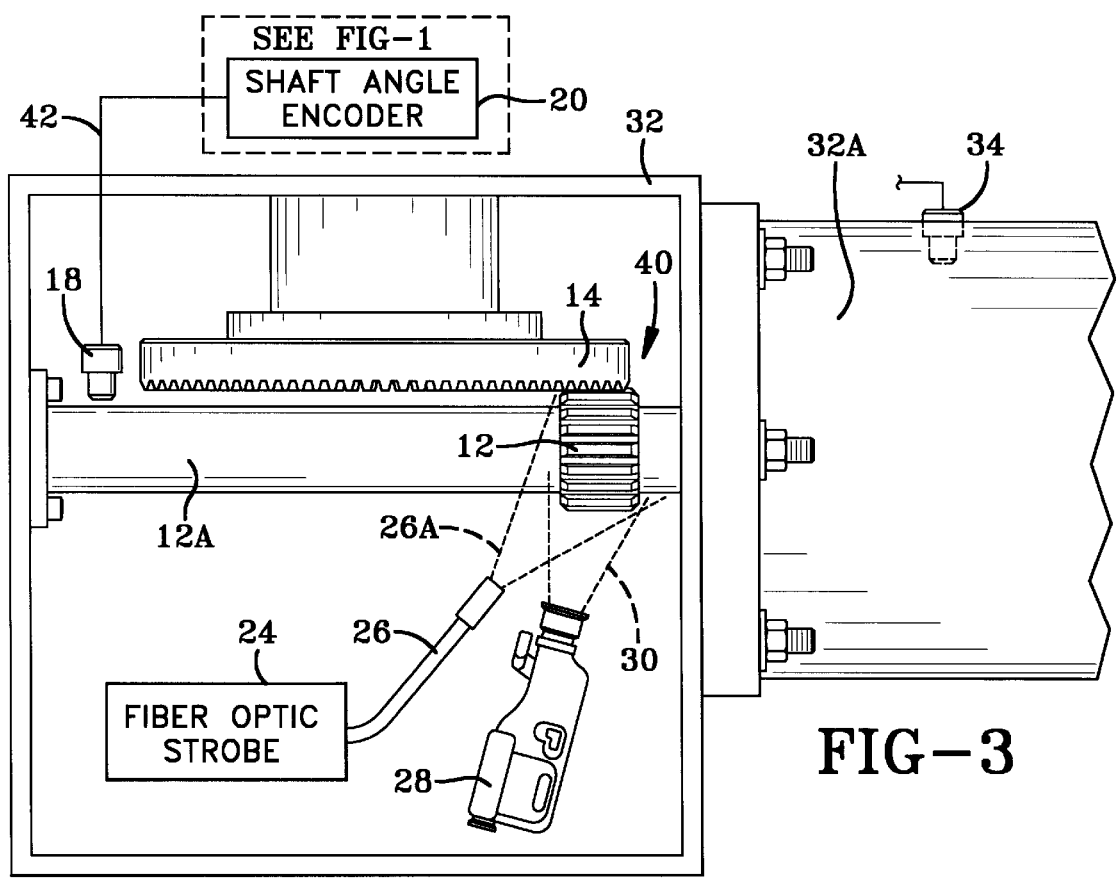
FIG. 3 schematically illustrates a top view of rotatable means of FIG. 1 showing the intermeshing gears of FIG. 1 relatively to the fiber optic strobe device and digital video camera both of FIG. 1.

FIG. 3 illustrates the location 40 as being defined by the region encompassed by a light pattern 26A being emitted from the probe 26 of the fiber optic strobe device 24 and the field of view 30 of the digital video camera 28. More particularly, the fiber optic strobe device 24 and the digital video camera 28 are focussed in correspondence with each other so as to optically coincide on the region defined by location 40. FIG. 3 further illustrates the sensor 18 as being connected to the shaft angle encoder 20 of FIG. 1 by way of signal path 42.

The CPU 16 of FIG. 1, as well as the CPU 36, may be a Gateway 2000 P5-100XL computer with a 1 giga byte hard drive and 16 megabytes of random access memory (RAM). Preferably the CPU 16 has installed an EPIX frame grabber board, known in the art, with 16 megabytes of RAM providing storage for several images, an IEEE 488 digital interface card, and a data acquisition card commercially made available from National Instruments.

The sensor 18, shown most clearly in FIG. 2, may be a magnetic or optical pick-up device interconnected to the same drive mechanism that drives either gear 12 or 14, and provides a signal each time either of the interconnected rotating gears 12 or 14 completes one (360°) revolution. The once per revolution signal is applied to the shaft angle encoder 20 by way of signal path 42. The shaft angle encoder means 20 also receives a signal, to be described with reference to FIG. 4, generated by CPU 16 and applied thereto via signal path 44. The CPU 16 supplies a control signal, to be described with reference to FIG. 4, on signal path 46 that is routed to the frequency divider 22.

In operation, the shaft angle encoder 20 takes the once per revolution input signal or pulse from the sensor 18 on the drive shaft 12A of FIG. 2 and divides that time interval by the counts-per-rev which is used by the controlling program of a user to be described with reference to FIG. 4. For example; the user inputs a counts-per-rev value of 20,000 which is equivalent to the time it takes the shaft, such as drive shaft 12A, to complete one revolution. The 20,000 count is generated by the shaft angle encoder and each count thereof is represented by a digital signal. The once per revolution count is divided by this number (20,000) and therefore breaks each once per revolution time interval into very small time intervals called preset values. A setup procedure, to be described with reference to FIG. 4, directs the user to adjust the controlling program for the correct preset value for each tooth on the gear and save these values in the program. This is a one-time setup procedure for each different gear or change in shaft speed.

The shaft angle encoder 20 also allows for relatively small adjustments in the phase time to place each tooth of the rotating gear 12 in the field of view 30 of the digital video camera 28 at the time of acquisition. The adjustment of the phase time by the shaft angle encoder 20 provides for the precise alignment of the tooth of interest of the gear 12 under analysis to be precisely located at location 40, at the precise time the digital video camera 28 captures an image of location 40. The shaft angle encoder may be of the type made available from Real Time Systems, Inc., of Mount Vernon, N.Y. The shaft angle encoder means 20 routes its digital output pulses to the frequency divider 22 by way of signal path 48.

The frequency divider 22 operates in a manner known in the art to provide an output frequency which is a fraction of the input frequency corresponding to the digital pulses which, in turn, correspond to the time interval signals generated by the shaft angle encoder means 20. The frequency divider 22 allows the next pulse to pass from the shaft angle encoder 20 to the fiber optic strobe device 24 upon a command pulse on signal path 46 from CPU 16. The next pulse is routed to fiber optic strobe device 24 via signal path 50 and occurs during the integration time of the digital video camera 28.

The fiber optic strobe device 24 generates a brief duration bright burst of light 26A (see FIG. 3) that is directed, via probe 26, to one region that encompasses the location 40 of the corresponding tooth of interest of the rotating gear 12 being analyzed. The digital video camera 28 is focused, in correspondence with the fiber optic strobe device 24, on the location 40. The cooperative focussing of the fiber optic strobe device 24 and the digital video camera 28 is most clearly seen in FIG. 3.

The fiber optic strobe device 24 of FIG. 1 is triggered each time a given tooth under inspection makes one revolution corresponding to the shaft angle encoder 20 outputting a pulse of signal path 48. Because the integration time of the camera is slow compared to this one-per-rev pulse it is preferred that the frequency divider 22 be employed. More particularly, if the frequency divider 22 was absent multiple pulses from the shaft angle encoder 20 would pass directly to the fiber optic strobe device 24, via signal path 50, and superimpose several images over one another during the integration time of the camera 28. Therefore, the frequency divider is configured such that all pulses from the encoder are blocked until a pulse from the controlling program is sent, via signal path 46, to the frequency divider 22 in which case the next pulse and only that pulse is allowed to pass to the strobe thus exposing only one image on the CCD of the camera 28.

The digital video camera 28 serves as the means for digitally recording an image of the corresponding location 40. The digital video camera 28 may be of the Model TM-9701 available from Pulnix of Buffalo Grove, Ill. The digital video camera 28 is placed into asynchronous operation by way of the operating routines to be further described with reference to FIG. 4. The asynchronous operation allows the camera to integrate for one frame period during which time the fiber optic strobe device 24 will fire once allowing for the creation of a single digital image. Asynchronous operation of a video camera that creates a single field image is known in the art and one such device is described in U.S. Pat. No. 4,896,211, which is herein incorporated by reference.

The system 10, in particular the digital video camera 28, only images one gear and only one tooth at a time of the gear under inspection. Gear 12, shown most clearly in FIG. 2, is normally but not always the gear under inspection. By imaging only one tooth, i.e., the tooth is zoomed upon with a macro lens of the digital video camera 28 to increase the resolution of the image since the limiting resolution is typically set by the camera CCD sensor of the digital video camera.

The system 10, in particular the digital video camera 28, can be manipulated so that it not only inspects gear teeth but it can be placed into viewing mode where a test operator can view each tooth or a selection of teeth on a test gear in the monitor 16A in the control room (not shown). This is accomplished by placing the camera 28 in normal acquisition mode (default mode) and allowing all of the pulses from the encoder 22 to pass to the fiber optic strobe device 24. This illuminates a given tooth for predetermined number of seconds and then moves onto the next programmed tooth. The system 10 operated in this manner can also be employed to grab still images of each tooth and display them on the monitor 16A but not save them to the hard drive as in the acquisition mode to be described with reference to FIG. 4.

In general, the digital video camera 28 cooperates with the operation of the fiber optic strobe device 24 so that the location 40 corresponding to the tooth of interest of rotating gear 12 is illuminated while at the same time the digital recording of the image at the location 40 is accomplished so that a digital output signal corresponding to a single frame of the video image occurs which, in turn, corresponds to a single tooth image of interest of the rotating gear 12. The output digital image of the video camera 28 is sent to the video frame grabber of the CPU 16 via signal path 52. The CPU 16 also receives control information, in particular a trigger signal to be further described with reference to FIG. 4, from CPU 36 via signal path 54.

In one embodiment, the digital imaging system 10 is integrated with the vibration detection system comprising elements 32, 34 and 36 and operates automonously to capture images of each gear tooth at location 40 at predetermined vibration thresholds. In this embodiment, the acquisition process of the digital video camera 28 starts with a signal on signal path 54 generated by computer (CPU 36) monitoring the vibration levels of the rotatable means 32. Several predetermined vibration levels may be selected. Once the first selected level is reached the computer (CPU 36) sends a signal on signal path 54 to the Gear Mesh Imaging System 10, in particular CPU 16, which initiates the acquisition mode to be described with reference to FIG. 4. The program being run in CPU 12 selects the first tooth to image and continues to image each tooth until all have been imaged which constitutes a herein termed "series." Several series of images may be saved during the course of an analysis of any gear.

The operation of the present invention may be further described with reference to FIG. 4 which illustrates a flow chart defining an overall operational sequence 56 which is comprised of configuration events and program segments all tabulated in Table 1.

TABLE 1

| REFERENCE NUMBER | CONFIGURATION EVENT/PROGRAM SEGMENT |
| --- | --- |
| 58 | CONFIGURE DIGITAL VIDEO CAMERA 28 |
| 60 | CONFIGURE IEEE 488 GPIB |
| 62 | CONFIGURE COUNTS PER REVOLUTION |
| 63 | CONFIGURE PRESET VALUES |
| 64 | CONFIGURE DIGITAL I/O |
| 66 | INITIATE SERIES COUNT SERIES |
| 68 | LOOP FOR TRIGGER FROM SECONDARY COMPUTER |
| 70 | LOOP THROUGH N IMAGES |
| 72 | PLACE CAMERA IN ASYNCHRONOUS OPERATION |
| 74 | SEND PHASE TO ENCODER |
| 76 | SEND RESET SIGNAL TO FLASH CONTROL |
| 78 | FIRE STROBE |
| 80 | GRAB VIDEO FRAME |
| 82 | COUNT < N |
| 84 | WRITE N IMAGES TO HARD DRIVE |

Figure 4:
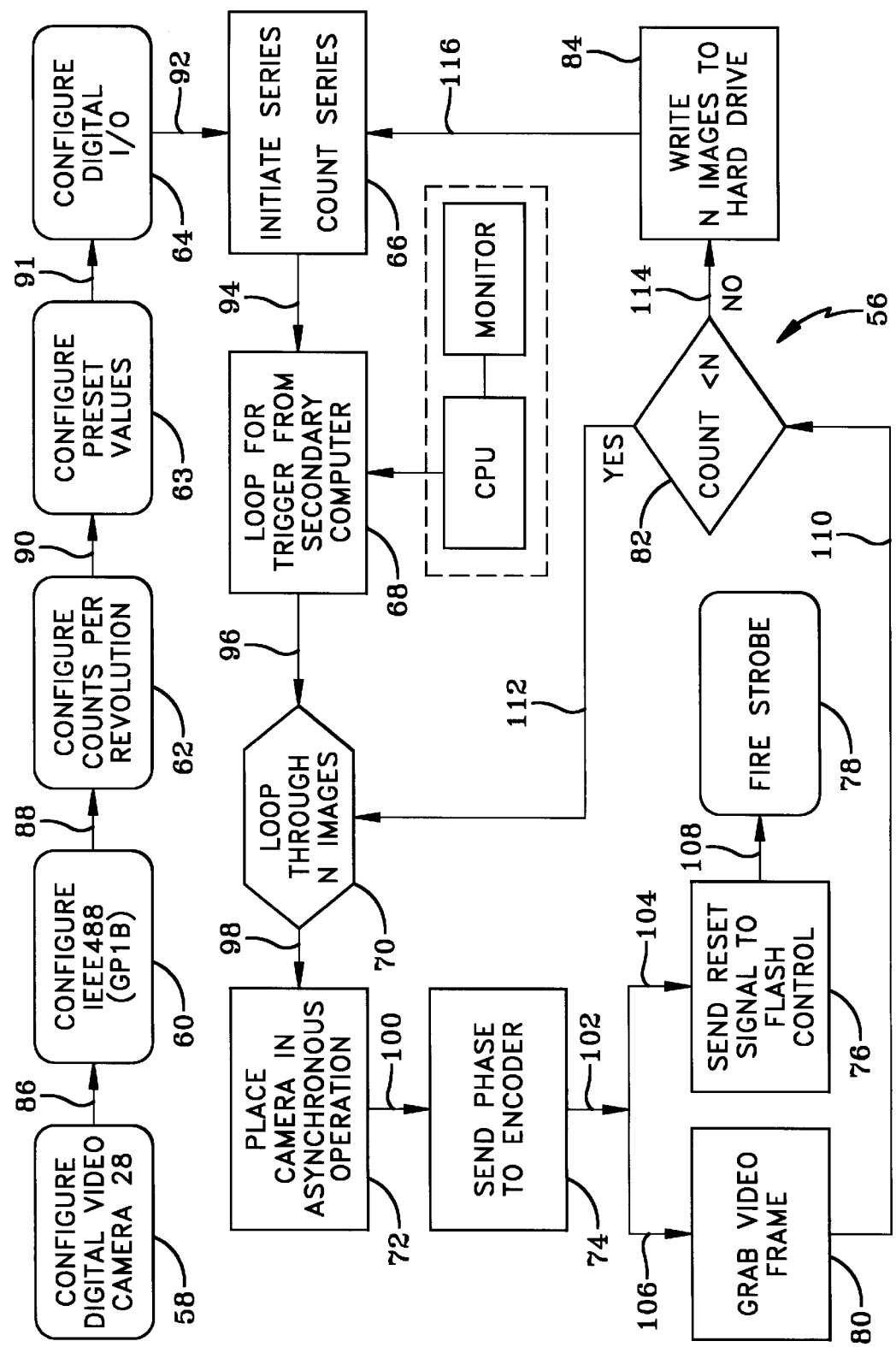
FIG. 4 is a flow chart of the overall operation of the embodiment of FIG. 1.

In general, the overall operation 56 illustrated in FIG. 4 coordinates the operation of fiber optic strobe device 24, the frequency divider 22, the shaft angle encoder 20, and the digital video camera 28. If desired, the operating routines being performed in CPU 16 can be altered so as to change the digital video camera from its acquisition mode (gathering images) to its viewing mode (viewing images), thereby, allowing for the manual or automated viewing of the gears under investigation in a manner as previously described. In one embodiment, such as the embodiment of FIG. 1, the imaging system 10 is integrated with the vibration detection system such that the CPU 36 of the vibration detection system generates a trigger signal which is sent to the imaging system 10 to start acquiring images of the teeth of the gear under analysis. The digital video imaging system 10 acquires one image of a gear tooth and stores it in the frame grabber on board memory. Typically, such acquisition is continued until images of all teeth of one rotating gear 12 has been captured and stored in the on board memory of the frame grabber within the CPU 16. All of the teeth captured on a given gear comprise a series as previously mentioned.

The digital video camera 28 is placed into an asynchronous operation by the operating program illustrated in FIG. 4. The asynchronous operation allows the camera to integrate for one frame period during which time the fiber optic strobe 24 will fire once creating a single digital image. The digital video camera 28 is focused so that its field of view encompasses the examination region, that is, location 40 that corresponds to the tooth of interest of the rotating gear 12. As the gear, in particular the teeth of the gear 12 of interest under analysis, enters into location 40, the gear 12 is illuminated with a high intensity light flash of short duration resulting in a beam pattern 26A (see FIG. 3) generated by the fiber optic strobe device 24. The digital video camera 28 produces a video signal which represents a single frame of a video image which, in turn, corresponds to the image of the tooth of interest of the rotating gear 12.

With reference to FIG. 4, the overall operation 56 is initiated by configuration event 58. Event 58 is an automated sequence of initialization functions that direct the controlling program 56 to go through and properly setup the frame grabber within the CPU 16 for the particular camera that is employed. This event 58 comprises a software configuration and control operation, known in the art, of the hardware components, such as the frame grabber. The configuration event 58 when complete passes control, via signal path 86, to configuration event 60.

Configuration event 60 is similar to event 58 except for the IEEE 488 card within the CPU 16 and causes or takes into account the necessary set-up for the CPU 16 so that its general purpose interface bus (GPIB), more particularly, its IEEE 488 interface that connects the shaft angle encoder 20 to CPU 16 is established. Once the IEEE 488 interface is established control is passed, via signal path 88, to configuration event 62.

Configuration event 62 is indicative that the operating routines within the CPU 16 supplies the control signal via signal path 44 to the shaft angle encoder 20 so as to set the counts per revolution on the shaft angle encoder means 20. These counts (digital pulses from an interconnected encoder of the shaft angle encoder 20) determine the angular position (e.g., 0–360°) of the gear 12 which has a predetermined number of circumferentially spaced apart teeth. Each position of each tooth of the gear is predetermined relative to its angular position which is translatable to a predetermined count (number of digital pulses) corresponding to configuration event 63 (configure preset valves). Each tooth of the gear 12 has a predetermined circumferential location that can be predicted to arrive at location 40 at a precise time. This prediction is accomplished by essentially dividing the gear of interest, that is, gear 12, into discrete time intervals in a manner as previously described. The discrete time intervals in particular correspond to the mating teeth of interest of the rotating gears 12 and 14.

After configuration event 62 is accomplished control is passed, via signal path 90, to the configuration event 63, which after its completion, passes control, via signal path 91, to configuration event 64 which is similar to event 60 except for the data acquisition card within the CPU 16. configuration event 64 configures the input and output ports of the data acquisition card to receive and send commands. After configuration event 64 is accomplished control is passed, via signal path 92, to program segment 66.

Program segment 66 initiates and counts a series (all of the teeth captured on a given gear) which is a full set of images of each gear tooth on the gear at a predetermined single vibration level (previously discussed) for the embodiment of FIG. 1. Once the next vibrational level is reached another series of images is initiated and counted waiting to be utilized in response to the appropriate signals generated by the CPU 16. Program segment 66 passes control, via signal path 94, to program segment 68.

The program segment 68 is only needed for the embodiment of FIG. 1 that causes the cooperative interaction between the vibration detection system comprising elements 32, 34 and 36 and the video imaging system 10 of the present invention. The CPU 36 of the vibration detection system monitors the information on signal path 38 which is indicative of the amount of vibration that the rotatable means 32 is encountering. The CPU 36, operating in response to appropriate routines, known in the art, measures the vibration and once a specific vibration is reached, the CPU 36 sends a trigger signal, via signal path 54, to the imaging system 10, more particularly, to the CPU 16 which, in turn, causes program event 68 of FIG. 2 to pass control, via signal path 96, to program segment 70.

Program segment 70 determines the number (N) of images to be obtained, that is, the number of meshing teeth of the rotating gear 12 that is to be examined for the determination of the progression of tooth wear, gear pitting, and fractures that eventually lead to overall gear failure. The number (N) is selected for a particular application and program segment initiates the loop to capture all of the teeth of interest of gear 12. Upon initiation of loop, program segment 70 passes control, via signal path 98 to program segment 72.

Program segment 72 places, via signal path 52 of FIG. 1, the digital video camera 28 into asynchronous operation (previously discussed) so as to acquire only one video frame. Program segment 72 then passes control, via signal path 100 of FIG. 4, to program segment 74.

Program segment 74, via signal path 42 of FIG. 1, then sends the phase to the shaft angle encoder 20 that may exist between the digital signals generated by shaft angle encoder 20 representative of the angular position of the rotating meshing gears 12 and 14, more particularly, the meshing teeth of interest of the rotating gear 12. This phase allows the operating routines of program segment 74 to precisely pick the exact tooth of interest of the rotating gear 12 so that it arrives precisely at location 40 in precise operative unity with the digital camera 28 and the fiber optic strobe device 24. Program segment 74 then passes control, via signal paths 102 and 104, to the program segment 76.

Program segment 76, via an appropriate control signal generated by CPU 1 on signal path 46 of FIG. 1, allows the frequency divider 22 to allow the next encoder pulse to pass onto signal path 50. Program segment 76 passes control, via signal path 108 of FIG. 2, to program segment 78.

Program segment 78 fires the fiber optic strobe device 24 at the precise moment that the gear tooth of interest is in the field of view 30 of the digital video camera 28 both of which optically coincide at location 40. The digital video camera 28 captures an image which is stored in on board memory, more particularly, in its frame grabber logic which storing is indicated in FIG. 4 by way of program event 80 and signal path 106 entering program segment 80.

Program event 80 after completion, passes control, via signal path 110, to program segment 82.

Program segment 82 determines if the number of images, previously established by program segment 70, has been acquired and if all the images have not been acquired passes control via signal path 112 back to program segment 70. Program segments 70, 72, 74, 76 and 78 are then repeated and the overall program 56 loops back again to program segment 82 as shown in FIG. 4. once program segment 82 has been satisfied, control is passed, via signal path 114, to program segment 84.

Program segment 84 writes the images to the hard drive of the CPU 16 so that the proper analysis of tooth pitting, spalling and teeth fractures that lead to gear failure may be performed. This analysis may be immediately performed to supply immediate feedback to correct for any failures or, conversely, may be performed at a more convenient time to analyze the possible failures over a predetermined time period. Once program segment 84 is complete, control is passed, via signal path 116, back to the program segment 66, which awaits for the commands to examine the next series of teeth.

It should now be appreciated that the practice of the present invention provides for a video imaging system that allows for the capturing of images of a high speed gear so that each individual tooth of a gear may be captured as a digital image to allow for its analysis. The present invention allows for the gathering of temporal data in the form of images to construct a history of failure over time. The data gathered by the present invention allows one the ability to track a crack or pit developed in a gear tooth and measure its progression or expansion over time. The acquired images of the present invention are digitized allowing the investigators to immediately analyze and make measurements of the images providing valuable feedback.

It should be further appreciated that the practice of the present invention provides various image processing and inspection tools for during and post-test analysis. The system 10 of the present invention can be expanded to incorporate tools relative to the process the system is deployed, i.e., manufacturing line or gear testing and may necessitate a different set of tools for analysis.

In addition, it should be recognized that the present invention provides an automated and computer controlled imaging system used for gear inspection that can be continuously run to acquire multiple images without any need for any supervision of the imaging system.

The present invention has been described with reference to a preferred embodiment and alternates thereof. It is believed that any modifications and alterations to the embodiment as discussed herein will readily suggest themselves to those skilled in the art upon reading and understanding the detailed description of the invention. It is intended to include all such modifications and alterations insofar as they come within the scope of the present invention.

What I claim is:

1. A gear inspection apparatus for inspecting a region encompassing the location of corresponding teeth of a gear mounted on a rotating shaft and having a predefined number of teeth, said apparatus comprising:
   (a) means for equating the amount of shaft rotation of said gear into discrete time interval signals each defining the location of particular tooth of said gear, said gear being substantially free of a reflective coating, said equating means being responsive to a first control signal so as to generate said discrete time interval signals;
   (b) means for illuminating said region, said means for illumination being responsive to said discrete time interval signals for activation thereof; and
   (c) means for digitally recording an image and providing an output digital representation thereof, said means for digitally recording an image being focussed on said region and in correspondence with said means for illuminating so as to optically coincide on said region and being responsive to a second control signal so as to record said image.

2. The gear inspection apparatus according to claim 1, wherein said means for equating comprises;
   (a) a sensor coupled to said rotating shaft and generating an output pulse when said shaft has rotated a complete revolution; and
   (b) encoding means receiving said output pulse and providing digital signals corresponding to said complete rotation of said gear, said output digital representations being divided by said predefined number of teeth so as to define said discrete time interval signals.

3. The gear inspection apparatus according to claim 2, wherein said means for equating further comprises a frequency divider interposed between said encoding means and said means for illuminating, said frequency divider receiving said discrete time interval signals and providing corresponding signals which are a fraction of the frequency of said discrete time interval signals and which are routed to said means for illuminating.

4. The gear inspection apparatus according to claim 1, further comprising a central processing unit receiving said output digital representation of said means for digitally recording and generating said first and second control signals.

5. The gear inspection apparatus according to claim 4, where in said central processing unit is responsive to a trigger signal for generating said first and second control signals, and wherein said apparatus further comprises:

(a) rotation means for mounting and driving said rotating gear;

(b) means for sensing the amount of vibration of said rotation means and providing an electrical signal representative of said amount of vibration; and (c) means for receiving said electrical signal and generating said trigger signal when said amount of vibration is greater than a predetermined value.

6. The gear inspection apparatus according to claim 1, wherein said means for illuminating comprises a fiber optic strobe device.

7. The gear inspection apparatus according to claim 1, wherein said means for digitally recording comprises a digital video camera.

8. A method for inspecting gears by examining a region encompassing the location of corresponding teeth of a gear mounted on a rotating shaft and having a predefined number of teeth, said method comprising the steps of:

(a) equating the amount of shaft rotation of said gear into discrete time interval signals each defining the location of particular tooth of said gear, said gear being substantially free of a reflective coating;

(b) generating said discrete time interval signals;

(c) illuminating said region encompassing said location, said illuminating step being responsive to said discrete time interval signals; and (d) digitally recording an image at said location and providing an output digital representation thereof, steps c) and (d) being accomplished simultaneously.

9. The method for inspecting gears according to claim 8, wherein said illuminating and digitally recording steps are simultaneously coordinated so that said location is illuminated while at the same time said digitally recording of said image is being accomplished so that said output digital representation corresponds to a single frame of a video image that, in turn, corresponds to a single tooth of said rotating gear.

10. The method for inspecting gears according to claim 8 further comprising the step of:

providing a central processor unit for receiving said output digital representation and for providing appropriate control signals to accomplish said simultaneous occurrence of said steps (c) and (d) of claim 8.

11. A method for automatically inspecting gears without any supervision by a user by examining a region encompassing the location of corresponding teeth of a gear mounted on a rotating shaft and having a predefined number of teeth, said method comprising the steps of:

(a) equating the amount of shaft rotation of said gear into discrete time interval signals each defining the location of particular tooth of said gear, said gear being substantially free of a reflective coating;

(b) generating said discrete time interval signals;

(c) illuminating said region encompassing said location, said illuminating step being responsive to said discrete time interval signals;

(d) digitally recording an image at said location and providing an output digital representation thereof, steps (c) and (d) being accomplished simultaneously;

(e) providing a central processor unit for receiving said output digital representation and for providing appropriate control signals to accomplish said simultaneous occurrence of said steps (c) and (d); and (f) providing said central processor unit with a controlling program to digitally acquire said images.

12. The method for automatically inspecting gears without any supervision by a user according to claim 11, wherein said illuminating and digitally recording steps are simultaneously coordinated so that said location is illuminated while at the same time said digitally recording of said image is being accomplished so that said output digital representation corresponds to a single frame of a video image that, in turn, corresponds to a single tooth of said rotating gear.

13. The method for automatically inspecting gears without any supervision by a user according to claim 11, wherein said digitally recording an image is provided by a digital camera having acquisition mode and viewing mode capabilities switchable in response to an external signal and wherein said controlling program generates said external signal so as to switch between acquisition mode and viewing mode allowing said user to view in real time said gear teeth.

* * * * *